United States Patent
Eder

(10) Patent No.: US 10,454,999 B2
(45) Date of Patent: Oct. 22, 2019

(54) COORDINATION OF INTER-OPERABLE INFRASTRUCTURE AS A SERVICE (IAAS) AND PLATFORM AS A SERVICE (PAAS)

(71) Applicant: Red Hat, Inc., Raleigh, NC (US)

(72) Inventor: Jeremy Eder, Garner, NC (US)

(73) Assignee: Red Hat, Inc., Raleigh, NC (US)

( * ) Notice: Subject to any disclaimer, the term of this patent is extended or adjusted under 35 U.S.C. 154(b) by 816 days.

(21) Appl. No.: 13/827,376

(22) Filed: Mar. 14, 2013

(65) Prior Publication Data

US 2014/0280437 A1    Sep. 18, 2014

(51) Int. Cl.
H04L 29/08    (2006.01)

(52) U.S. Cl.
CPC .................... *H04L 67/10* (2013.01)

(58) Field of Classification Search
CPC ............ G06F 2209/505; G06F 9/3891; G06F 9/45533; G06F 9/5055; G06F 9/5061; G06F 9/541; H04L 12/18; H04L 67/10; H04L 67/2814
USPC ........................................................ 709/201
See application file for complete search history.

(56) References Cited

U.S. PATENT DOCUMENTS

| | | | | |
|---|---|---|---|---|
| 9,246,765 B2* | 1/2016 | Panuganty | ............... | H04L 41/12 |
| 9,930,138 B2* | 3/2018 | Ferris | .................... | H04L 67/32 |
| 2002/0087958 A1* | 7/2002 | Krause | ................ | G06F 9/44563 717/166 |
| 2002/0161869 A1* | 10/2002 | Griffin et al. | .................. | 709/221 |
| 2004/0019642 A1* | 1/2004 | Jinzaki | ........................... | 709/205 |
| 2008/0028071 A1* | 1/2008 | Miyajima | .......... | H04L 29/12028 709/224 |
| 2008/0036488 A1* | 2/2008 | Kelem | ................ | G06F 15/7867 326/10 |
| 2009/0024609 A1* | 1/2009 | Barker et al. | ..................... | 707/5 |
| 2010/0205301 A1* | 8/2010 | Ansari | ................... | G06Q 30/04 709/225 |
| 2011/0265164 A1* | 10/2011 | Lucovsky | ........... | G06F 9/45533 726/7 |
| 2012/0054626 A1* | 3/2012 | Odenheimer | ......... | G06F 9/5072 715/738 |
| 2012/0180040 A1* | 7/2012 | DeLuca | ............ | G06F 17/30867 718/1 |
| 2012/0215910 A1* | 8/2012 | Wada | .................... | G06F 3/1204 709/224 |
| 2012/0233668 A1* | 9/2012 | Leafe | .................... | G06F 9/5022 726/4 |

(Continued)

*Primary Examiner* — Kevin T Bates
*Assistant Examiner* — Ronak Patel
(74) *Attorney, Agent, or Firm* — Lowenstein Sandler LLP

(57) ABSTRACT

A system and a method are disclosed for coordinating an inter-operable Platform as a Service (PaaS) layer and an Infrastructure as a Service (IaaS) layer. In one example, the method includes receiving, by a processing device associated with a PaaS layer, a message indicating a resource status associated with a plurality of resources of an IaaS layer, determining, by the processing device, a resource among the plurality of resources in the IaaS layer to instantiate a platform service of the PaaS layer, the determining is based on the message indicating the resource status associated with the plurality of resources of the IaaS layer; and transmitting, by the processing device, a message directing the IaaS layer to instantiate the platform service on the determined resource in the IaaS layer.

19 Claims, 5 Drawing Sheets

(56) References Cited

U.S. PATENT DOCUMENTS

| | | | | |
|---|---|---|---|---|
| 2012/0254862 A1* | 10/2012 | Dong | G06F 9/4856 | 718/1 |
| 2012/0324069 A1* | 12/2012 | Nori | G06F 9/5066 | 709/222 |
| 2013/0007088 A1* | 1/2013 | Alfredo | G06F 9/5066 | 709/201 |
| 2013/0019015 A1* | 1/2013 | Devarakonda | G06F 9/5072 | 709/226 |
| 2013/0046598 A1* | 2/2013 | Roberts | G06Q 30/0605 | 705/14.23 |
| 2013/0166703 A1* | 6/2013 | Hammer | H04L 41/50 | 709/220 |
| 2013/0232498 A1* | 9/2013 | Mangtani | G06F 9/5072 | 718/104 |
| 2013/0238785 A1* | 9/2013 | Hawk | G06F 9/5072 | 709/224 |
| 2013/0254758 A1* | 9/2013 | Walter | G06F 8/61 | 717/174 |
| 2014/0026058 A1* | 1/2014 | Jao | H04L 41/22 | 715/736 |
| 2014/0059226 A1* | 2/2014 | Messerli | G06F 9/5072 | 709/226 |
| 2014/0068611 A1* | 3/2014 | McGrath | G06F 9/45533 | 718/1 |
| 2014/0086177 A1* | 3/2014 | Adjakple | H04W 12/08 | 370/329 |
| 2014/0108665 A1* | 4/2014 | Arora | H04L 67/141 | 709/227 |
| 2014/0123292 A1* | 5/2014 | Schmidt | H04L 67/10 | 726/25 |
| 2014/0130036 A1* | 5/2014 | Gurikar | G06F 8/61 | 717/176 |
| 2014/0173594 A1* | 6/2014 | Ng | G06F 9/45533 | 718/1 |
| 2014/0214745 A1* | 7/2014 | Walsh | H04L 41/147 | 706/46 |
| 2014/0214915 A1* | 7/2014 | Dragon | H04L 43/04 | 709/201 |
| 2014/0215443 A1* | 7/2014 | Voccio | G06F 11/3612 | 717/128 |
| 2014/0215444 A1* | 7/2014 | Voccio | G06F 11/3644 | 717/128 |
| 2014/0215452 A1* | 7/2014 | Hicks | G06F 8/67 | 717/172 |
| 2014/0282889 A1* | 9/2014 | Ishaya | H04L 63/08 | 726/4 |

* cited by examiner

COORDINATION OF INTER-OPERABLE INFRASTRUCTURE AS A SERVICE (IAAS) AND PLATFORM AS A SERVICE (PAAS)

TECHNICAL FIELD

The present disclosure relates to cloud computing, and more specifically to a method and system coordination of inter-operable infrastructure as a service (IaaS) and platform as a service (PaaS) systems.

BACKGROUND

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together and provided to a client or an end user. Cloud computing is often provided "as a service" over the internet. Two distinct layers of such services in cloud computing can be in the form of the infrastructure as a service (IaaS) layer and the platform as a service (PaaS) layer.

The PaaS layer is a combination of a development platform and a set of software subsystems or components that may be used to deliver a fully functional product or service. It provides a platform on which software developers may build new applications or extend existing ones without the complexity of owning and managing the underlying hardware and software and provisioning hosting capabilities. In other words, the PaaS layer provides the supporting platform to enable the end user develop his or her own solutions.

The IaaS layer delivers computer infrastructure, including a virtualization environment, as a service. This may include servers, software, data-center space and network equipment, available in a single bundle and may be billed as per usage in a utility computing model. IaaS may generally be used by organizations that have the in-house expertise to manage their IT requirements but may not have the infrastructure. They may hire the infrastructure from IaaS providers and load up their libraries, applications, and data, after which they may configure them themselves.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems for coordinating an inter-operable PaaS layer and IaaS layer in a cloud computing environment are described. The coordination may be facilitated using a bi-directional feedback channel that allows messages to be transmitted and received between a PaaS layer and an IaaS layer of a cloud computing environment. The PaaS layer and the IaaS layer may publish information to each other to provide guidance to algorithms written at each layer. Such information may influence system decisions such as the addition or removal of hardware resources, the addition or removal of virtualized resources, the platform service application placement decisions, the re-allocation of existing resources (e.g., to facilitate maintenance windows) and the load-balancing of resources in the IaaS layer.

An example method includes receiving, by a processing device associated with a PaaS layer, a message indicating a resource status associated with a plurality of resources of an IaaS layer, determining, by the processing device, a resource among the plurality of resources in the IaaS layer to instantiate a platform service of the PaaS layer, the determining is based on the message indicating the resource status associated with the plurality of resources of the IaaS layer; and transmitting, by the processing device, a message directing the IaaS layer to instantiate the platform service on the determined resource in the IaaS layer.

In the following description, numerous details are set forth. It will be apparent that the aspects of the present disclosure may be practiced without these specific details. In some instances, well-known structures and devices are shown in block diagram form, rather than in detail, in order to avoid obscuring the disclosure.

Figure 1:
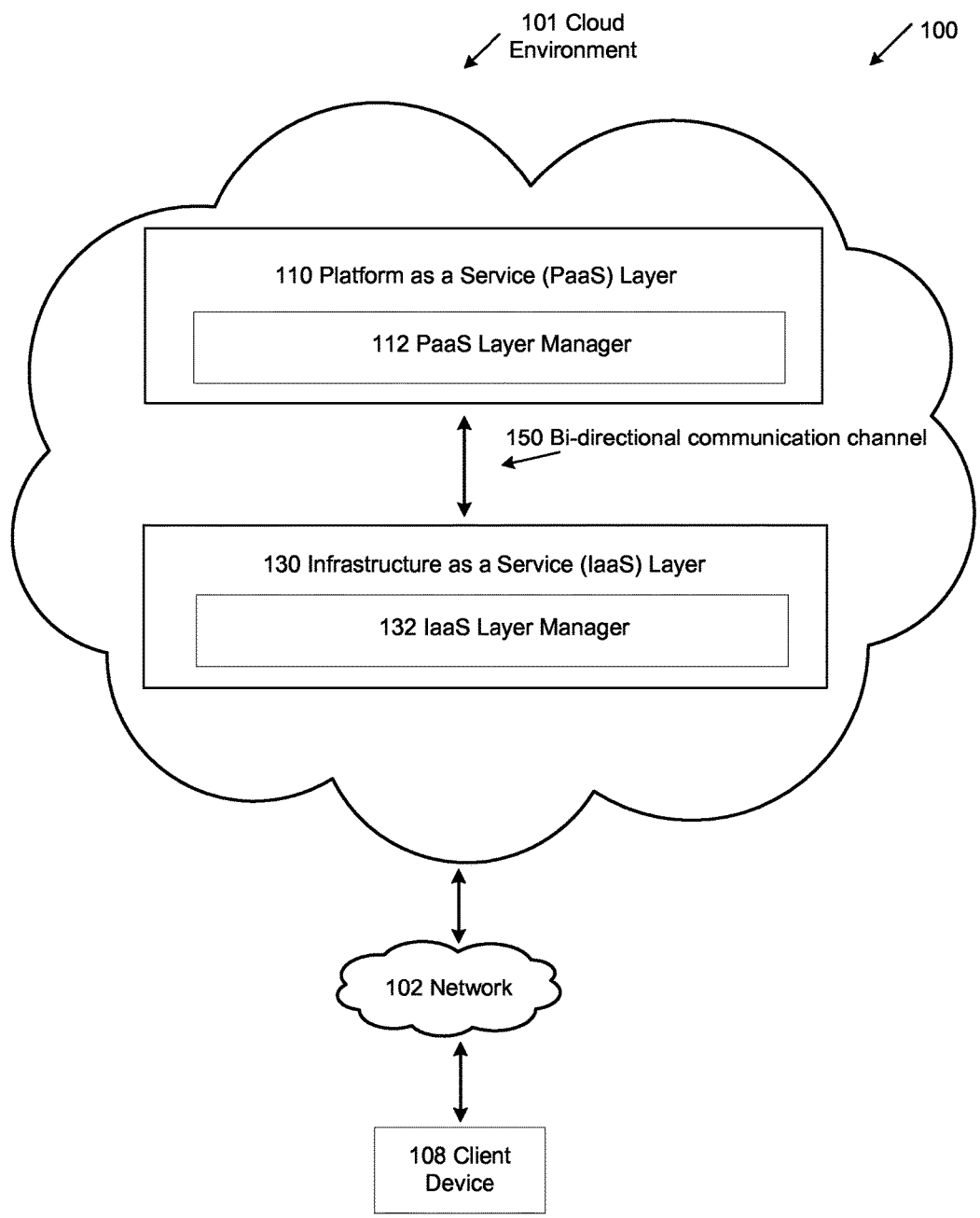
FIG. 1 depicts a block diagram illustrating an example cloud computing network architecture in which implementations of the present disclosure can operate.

FIG. 1 depicts a block diagram of an example cloud computing network architecture 100 that may include a network 102, a client device 108, a Platform as a Service (PaaS) layer 110, a PaaS Layer Manager 112, an Infrastructure as a Service (IaaS) layer 130, an IaaS Layer Manager 132, and a bi-directional communication channel 150 between the PaaS layer 110 and the IaaS layer 130.

As noted above, the IaaS layer may deliver computer infrastructure, including a virtualization environment, as a service. IaaS may generally be used by organizations that have the in-house expertise to manage their IT requirements but may not have the infrastructure. The PaaS layer may combine a development platform and a set of software subsystems or components that may be used to deliver a fully functional product or service. It provides a platform on which software developers may build new applications or extend existing ones without the complexity of owning and managing the underlying hardware and software and provisioning hosting capabilities. The IaaS layer 130 includes an IaaS Layer Manager 132 and the PaaS layer 110 includes a PaaS Layer Manager 112 to coordinate inter-operability between the two layers using the bi-directional communication channel 150. Each of the IaaS Layer Manager 132 and the PaaS Layer Manager 112 may reside on a computer system such as a server machine, a desktop computer, a laptop, etc. One example of such a computer system is described in greater detail below in conjunction with FIG. 5.

Referring to FIG. 1, the bi-directional communication channel 150 between the PaaS layer 110 and the IaaS layer 130 may be implemented by a protocol for managing devices on computer networks. An example of such a protocol may be Simple Network Management Protocol (SNMP). The bi-directional communication channel 150 may also be implemented by a specialized host-guest data channel that can be implemented in a client-server topology (e.g., Transmission Control Protocol (TCP)) that may involve a registration database. The bi-directional communication channel 150 may also be implemented by a non-database mesh topology for providing real-time feedback.

The client device 108 of FIG. 1 may be any device capable of communicating with the cloud environment 101 via the network 102 including, but not limited to, a computer, a smart phone, a wireless device, a tablet, and/or any suitable computing device. In an example, the client device 108 may be a mobile device (e.g., a handheld device, smart phone or web portal device) that communicates with the network 102 via a wireless connection. In an example, the cloud environment 101 may determine and verify an electronic address, (e.g., email address, IP address, etc.) that is in connection with the client device 108 associated with a user. It is also noted that the term "user" is used herein to refer to a person who uses the cloud environment 101.

The network 102 of FIG. 1 may be any type of communications medium that allows for the cloud environment 101 and the client device 108 to communicate with each other. The network 102 may be, for example, a private network (e.g., a local area network (LAN), a wide area network (WAN), intranet, etc.), a corporate network (e.g., a private network for an organization such as a corporation), and/or a public network (e.g., the Internet). For example, the user may communicate with the cloud environment 101 via the network 102 and the client device 108.

Figure 2:
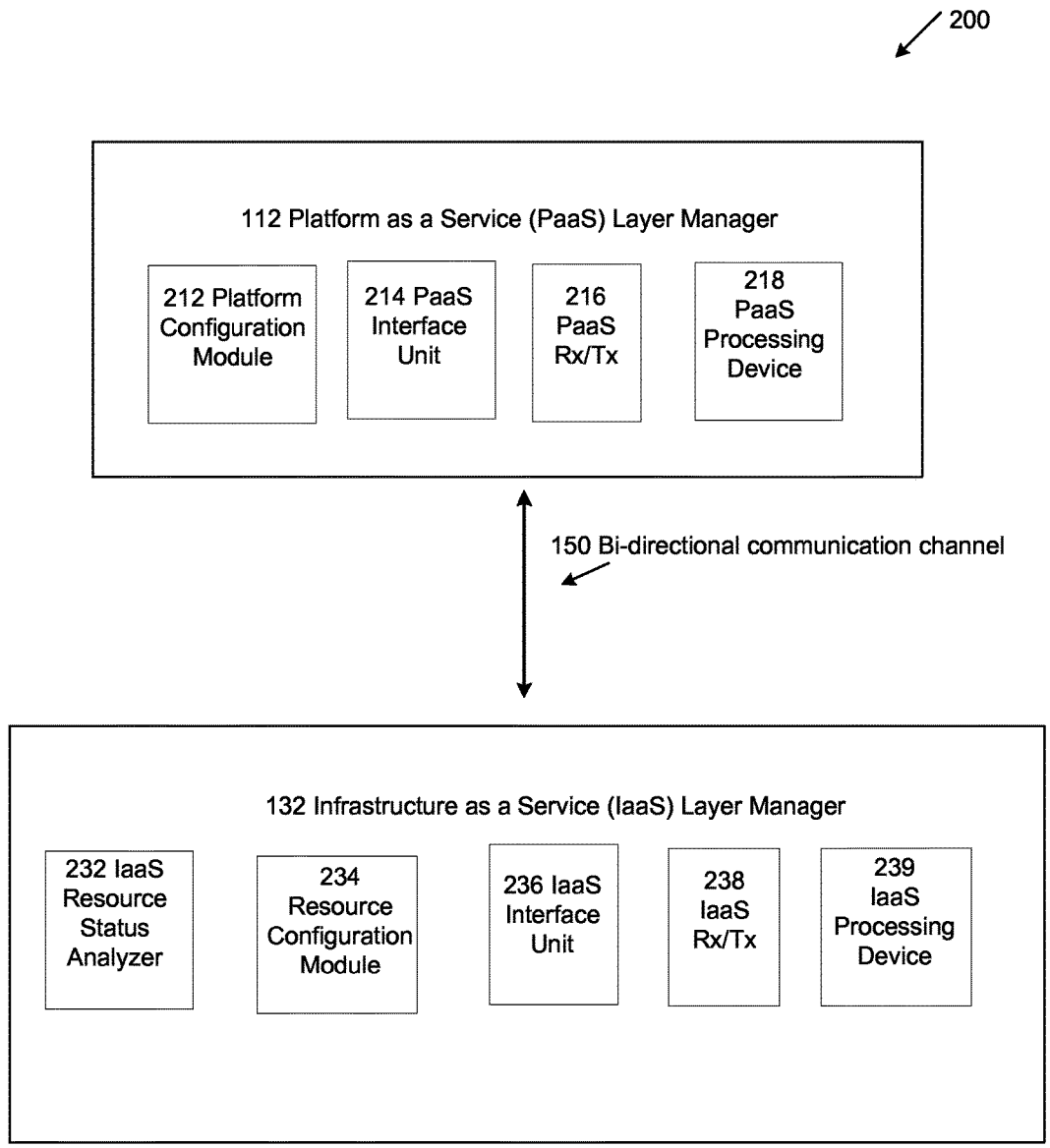
FIG. 2 depicts a block diagram of an example of coordinating an inter-operable PaaS layer and an IaaS layer in accordance with some implementations of the present disclosure.

FIG. 2 depicts a block diagram of an example of a PaaS Layer Manager 112, an IaaS Layer Manager 132, and the Bi-directional communication channel 150 as described above. The PaaS Layer Manager 112 may include a platform configuration module 212, a PaaS interface unit 214, a PaaS receiver/transmitter 216, and a PaaS processing device 218. The IaaS Layer Manager 132 may include an IaaS resource status analyzer 232, a platform service instantiation unit 234, an IaaS resource allocation unit 235, an IaaS interface unit 236, an IaaS receiver/transmitter 238, and an IaaS processing device 239.

Beginning with the IaaS Layer Manager 132 of FIG. 2, the IaaS resource status analyzer 232 may be responsible for analyzing the status of the resources of the IaaS layer 130. As used herein, the term "resources" may include, but is not limited to, hardware resources such as a random access memory, cpu, computer storage memory, and network bandwidth or channel capacity, and virtual computing resources such as virtual machines, virtual workstations, and virtual memory areas. Status of resources may include, but is not limited to, the utilization, bandwidth, and location of such resources. In an example, the IaaS resource status analyzer 232 may transmit the status of the IaaS resources to the PaaS Layer Manager 112 via the IaaS interface unit 236 and the IaaS receiver/transmitter 238. In another example, the IaaS resource status analyzer 232 may determine that certain resources in the IaaS layer 130 that may be underutilized, and may transmit a message to the PaaS Layer Manager 112 indicating that a platform service or application should be instantiated on such underutilized resources. In other words, such underutilized resources may be considered to be preferred resources of the IaaS layer 130 to instantiate a platform service.

In another example, the IaaS resource status analyzer 232 may determine resources in the IaaS layer 130 that may be consumed or fully utilized, and may transmit a message to the PaaS Layer Manager 112 indicating that a platform service or application should not be instantiated on such utilized resources. In other words, such utilized resources may be considered to be non-preferred resources of the IaaS layer 130 in which a platform service or application should not be instantiated on. In another example, the IaaS resource status analyzer 232 may determine a location status of the resources in the IaaS layer 130, and may transmit a message to the PaaS Layer Manager 112 indicating the location status of the resources with the IaaS layer 130.

The IaaS interface unit 236 may be a module that is responsible for interfacing with the PaaS layer 110 via the Bi-directional communication channel 150. In one example, the IaaS interface unit 236 may be a component that is configured to serve as a demarcation point between the IaaS layer 130 and the Bi-directional communication channel 150.

The IaaS receiver/transmitter 238 may be a component that is configured to transmit and receive messages to and from the PaaS Layer Manager 112. The IaaS processing device 239 may be a processor or a general-purpose processing device such as a microprocessor, central processing unit, or the like, as described in further detail below with respect to the processor 502 of FIG. 5.

The IaaS Layer Manager 132 may also include a resource configuration module 234, as shown in FIG. 2. In an example, the resource configuration module 234 may be responsible for receiving a message from the PaaS layer 110 that directs or instructs the IaaS Layer Manager 132 to instantiate a platform service or a platform application on a certain or specific resource in the IaaS layer 130. In another example, the resource configuration module 234 may receive a message from the PaaS Layer Manager 112 that identifies certain resources in the IaaS layer 130 that may be fully consumed, therefore a platform service or application should not be instantiated on such consumed resources in the IaaS layer 130. The resource configuration module 234 may also cause a platform service or application to be instantiated on an indicated resource in the IaaS layer 130 based on the received message from the PaaS Layer Manager 112. The resource configuration module 234 may also be responsible for allocating or removing resources within the IaaS layer 130, based on a message that may be received from the PaaS Layer Manager 112 indicating that additional resources should be added to the IaaS layer 130 or that the removal of resources from the IaaS layer 130 is warranted.

Referring to the PaaS Layer Manager 112 as shown in FIG. 2, the PaaS interface unit 214 may be a module that is responsible for interfacing with the IaaS layer 130 via the Bi-directional communication channel 150. In one example, the PaaS interface unit 214 may be a device that is configured to serve as a demarcation point between the PaaS layer 110 and the Bi-directional communication channel 150.

The PaaS receiver/transmitter 216 may be a device that is configured to transmit and receive messages to and from the IaaS Layer Manager 132. The PaaS processing device 218 may be a processor or a general-purpose processing device such as a microprocessor, central processing unit, or the like, as described in further detail below with respect to the processor 502 of FIG. 5.

The platform configuration module 212 as shown in FIG. 2 may be responsible for receiving a message indicating a resource status associated with a plurality of resources of the IaaS layer 130. The platform configuration module 212 may determine, based on the resource status, a certain resource among the plurality of resources in the IaaS layer 130 to instantiate a platform service of the PaaS layer 110. The platform configuration module 212 may generate a configuration message directing the IaaS Layer Manager 132 to instantiate the platform service on the determined resource in the IaaS layer 130. The configuration message may be transmitted to the IaaS Layer Manager 132 via the PaaS interface unit 214, the PaaS receiver/transmitter 216, and the Bi-directional communication channel 150.

In an example, the platform configuration module 212 may receive a message from the IaaS Layer Manager 132 indicating a preferred resource of the IaaS layer 130 to instantiate the platform service. Based on this message, the platform configuration module 212 may generate a configuration message directing the IaaS Layer Manager 132 to instantiate the platform service on the preferred resource in the IaaS layer 130.

In another example, the platform configuration module 212 may receive a message from the IaaS Layer Manager 132 indicating non-preferred resources of the IaaS layer 130 in which the platform service should not be instantiated on. For example, certain resources may be consumed or fully utilized, and therefore the platform service should not be instantiated on such resources. Based on this message, the platform configuration module 212 may generate a configuration message directing the IaaS Layer Manager 132 that the platform service should not be instantiated on such resources in the IaaS layer 130.

In another example, the platform configuration module 212 may determine whether to allocate additional resources to the IaaS layer 130 based on the received resource status associated with the plurality of resources of the IaaS layer 130. For example, if the resource status of the IaaS layer 130 indicates that there is an insufficient allocation of resources, the platform configuration module 212 may generate a message to the IaaS Layer Manager 132 that additional resources are needed.

In another example, the platform configuration module 212 may determine whether to remove unused resources from the IaaS layer 130 based on the received resource status. For example, if the resource status of the IaaS layer 130 indicates that there is an over-allocation of resources in the IaaS layer 130, the platform configuration module 212 may generate a message to the IaaS Layer Manager 132 that resources should be removed and/or redeployed elsewhere.

In another example, the platform configuration module 212 may receive a message indicating a location status associated with the plurality of resources of the IaaS layer 130, and another message indicating a location status associated with a user. The platform configuration module 212 may determine a resource in the IaaS layer 130 to instantiate a platform service, based on the location of the resource in the IaaS layer 130 and the location of the user. For example, the platform configuration module 212 may determine that the platform service should be instantiated on the resource in the IaaS layer 130 that is geographically located nearest to the user.

Figure 3:
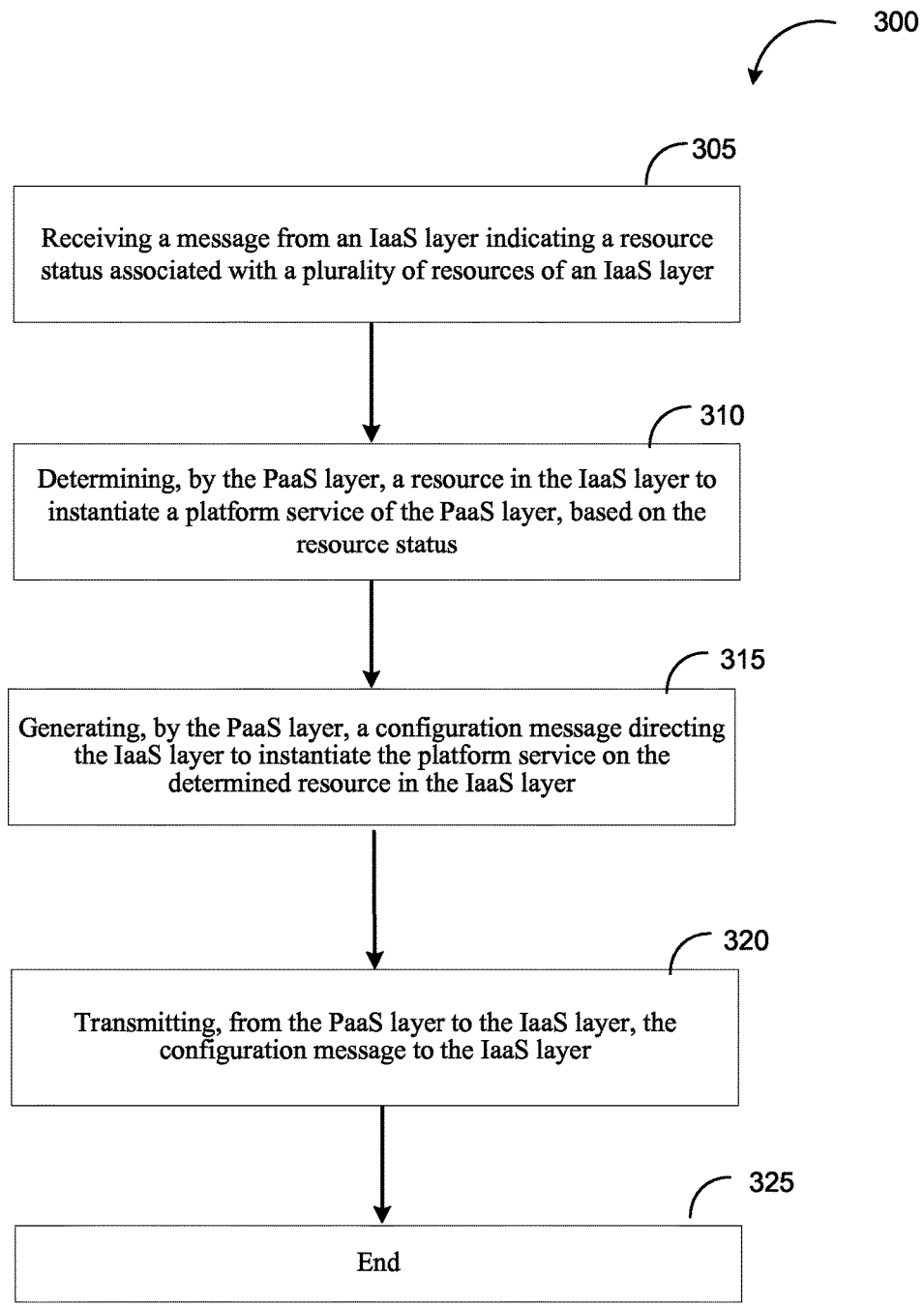
FIG. 3 shows a flow diagram illustrating an example of a method for coordinating an inter-operable PaaS layer and IaaS layer in a cloud computing environment in accordance with some implementations of the present disclosure.

FIG. 3 depicts a flow diagram of aspects of a method 300 for coordinating an inter-operable PaaS layer 110 and IaaS layer 130 in a cloud computing environment. The method 300 may be performed by processing logic that may include hardware (e.g., circuitry, dedicated logic, programmable logic, microcode, etc.), software (e.g., instructions run on a processing device to perform hardware simulation), or a combination thereof. In one example, the method 300 may be performed by a computer system as described below with respect to FIG. 5.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 3, the method begins at block 305, in which the PaaS Layer Manager 112 (e.g., the platform configuration module 212) may receive a message from the IaaS Layer Manager 132 indicating a resource status associated with a plurality of resources of an IaaS layer 130. As noted above, the resource status may include, but is not limited to, the utilization, bandwidth, and location of hardware, channel capacity, and virtual computing resources of the IaaS layer 130. At block 310, the platform configuration module 212 may determine a resource in the IaaS layer 130 to instantiate a platform service of the PaaS layer 110, based on the resource status. At block 315, the platform configuration module 212 may generate a configuration message directing the IaaS Layer Manager 132 to instantiate the platform service on the determined resource in the IaaS layer 130. At block 320, the PaaS Layer Manager 112 may transmit the configuration message to the IaaS Layer Manager 132, and the method 300 ends at block 325.

Figure 4:
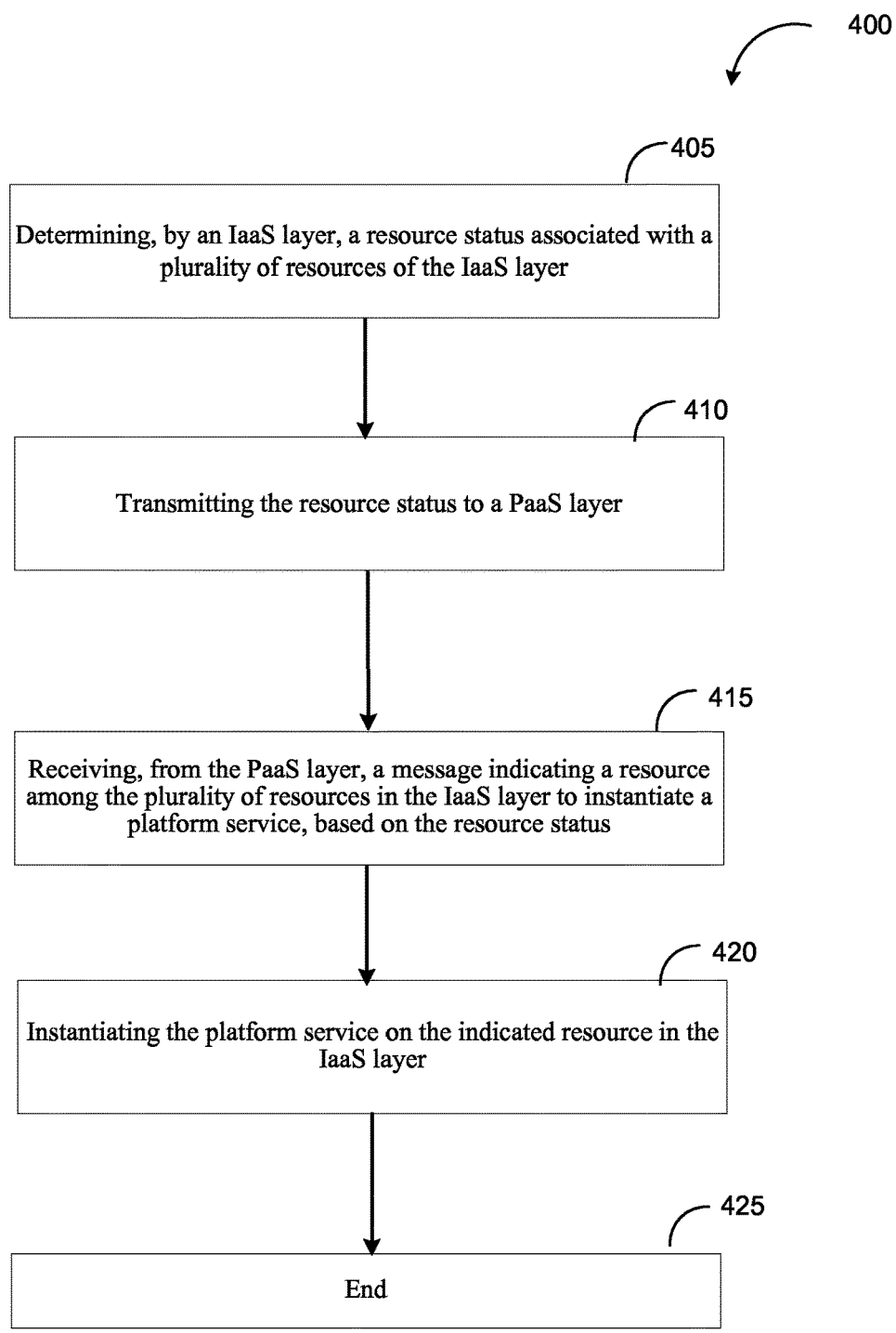
FIG. 4 depicts a flow diagram illustrating another example of a method for coordinating an inter-operable PaaS layer and IaaS layer in accordance with some implementations of the present disclosure.

FIG. 4 depicts a flow diagram illustrating a method 400 for coordinating an inter-operable PaaS layer 110 and IaaS layer 130. At block 405, the IaaS layer manager 132 (e.g., the IaaS resource status analyzer 232) may determine a resource status associated with a plurality of resources of the IaaS layer 130. As noted above, the resource status may include, but is not limited to, the utilization, bandwidth, and location of hardware, channel capacity, and virtual computing resources of the IaaS layer 130. At block 410, the IaaS Layer Manager 132 may transmit the resource status to a PaaS Layer Manager 112. At block 415, the IaaS resource configuration module 234 may receive, from the PaaS Layer Manager 112, a message indicating a resource among the plurality of resources in the IaaS layer 130 to instantiate a platform service, based on the resource status. At block 420, the IaaS resource configuration module 234 may instantiate the platform service on the indicated resource in the IaaS layer 130, and the method 400 ends at block 425.

Figure 5:
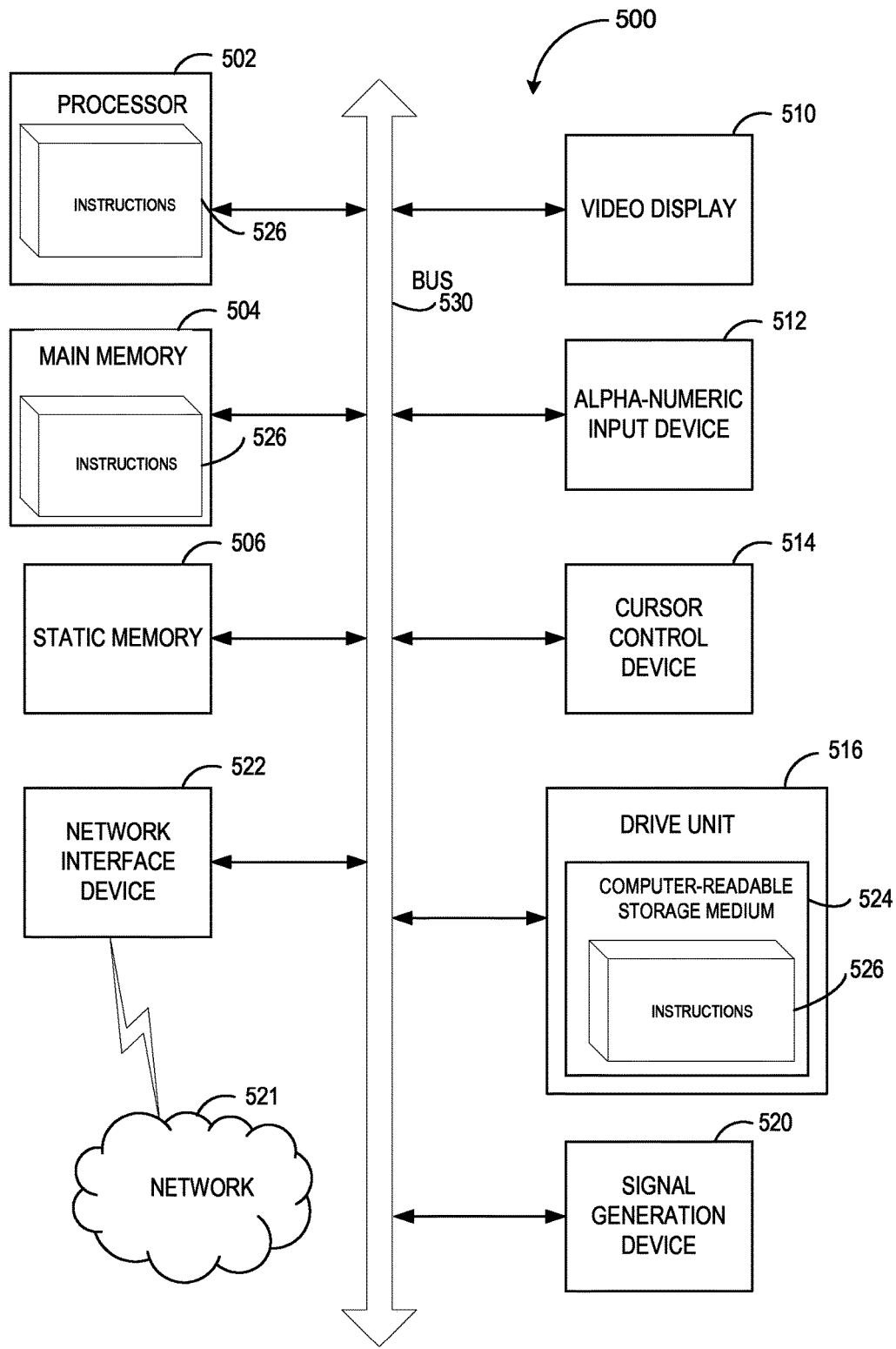
FIG. 5 depicts a diagrammatic representation of a machine in the form of a computer system, in accordance with one example.

FIG. 5 depicts a diagrammatic representation of a machine in the form of a computer system 500 within which a set of memory instructions 526, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 500 includes a processor 502 (e.g., a processing device), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the operations for the platform configuration module 212, the IaaS resource status analyzer, and the resource configuration module 234 for performing steps discussed herein.

The computer system 500 may further include a network interface device 522. The network interface device may be in communication with a network 521. The computer system 500 also may include a video display unit 510 (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a computer-readable storage medium (or more specifically a non-transitory computer-readable storage medium) 524 on which is stored one or more sets of instructions 526 (e.g., instructions executed by the configuration module 212, the IaaS resource status analyzer, or the resource configuration module 234) for the computer system 100 representing any one or more of the methodologies or functions described herein. The instructions 526 for the computer system 100 may also reside, completely or at least partially, within the main memory 504 and/or within the processor 502 during execution thereof by the computer system 500, the main memory 504 and the processing device 502 also constituting computer-readable storage media. The instructions 526 for the computer system 100 may further be transmitted or received over a network via the network interface device 522.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions 526. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled

What is claimed is:

1. A method comprising:

establishing, a bi-directional communication channel between a Platform as a Service (PaaS) layer and an Infrastructure as a Service (IaaS) layer using a PaaS interface unit that serves as a demarcation point between the PaaS layer and the bi-directional communication channel;

receiving, by a processing device associated with the PaaS layer, a first message from an IaaS layer manager through the bi-directional communication channel that indicates a resource status associated with each of a plurality of resources of the IaaS layer, the resource status comprising an indication of utilization of each of the plurality of the resources of the IaaS layer;

identifying, by a platform configuration module of a PaaS layer manager, a resource among the plurality of resources in the IaaS layer that is an identified resource of the IaaS layer, wherein the identifying is in view of whether the resource status in the first message indicates that the identified resource of the plurality of resources of the IaaS layer is underutilized;

determining, by the platform configuration module, to instantiate a platform service of the PaaS layer on the identified resource of the IaaS layer; and transmitting, by the PaaS layer manager, a second message through the bi-directional communication channel directing the IaaS layer to instantiate the platform service on the identified resource in the IaaS layer.

2. The method of claim 1, wherein the resource status further comprises at least one of an availability of random access memory, an availability of processing time, an availability of disk space, or an availability of network bandwidth.

3. The method of claim 1, further comprising:

receiving, by the processing device, a third message indicating a preferred resource of the IaaS layer to instantiate the platform service, and transmitting, by the processing device, a fourth message directing the platform service to instantiate on the preferred resource in the IaaS layer in view of the third message indicating the preferred resource of the IaaS layer.

4. The method of claim 1, further comprising:

receiving, by the processing device, a third message indicating a non-preferred resource of the IaaS layer to avoid instantiating the platform service; and transmitting, by the processing device, a fourth message directing the platform service to instantiate on a resource other than the non-preferred resource in the IaaS layer in view of the third message indicating the non-preferred resource of the IaaS layer.

5. The method of claim 1, further comprising:

determining, by the processing device, whether to allocate additional resources to the IaaS layer in view of the resource status associated with each of the plurality of resources of the IaaS layer; and transmitting, by the processing device, a third message directing the IaaS layer to allocate additional resources in the IaaS layer in response to a determination to allocate additional resources to the IaaS layer.

6. The method of claim 1, further comprising:

determining, by the processing device, whether to remove resources from the IaaS layer in view of the resource status associated with each of the plurality of resources of the IaaS layer; and transmitting, by the processing device, a third message directing the IaaS layer to remove resources from the IaaS layer in response to a determination to remove resources from the IaaS layer.

7. The method of claim 1, further comprising:

receiving, by the processing device, a third message indicating a location status associated with each of the plurality of resources of the IaaS layer;

receiving, by the processing device, a fourth message indicating a location status associated with a user;

determining, by the processing device, a resource among the plurality of resources in the IaaS layer to instantiate the platform service, the determining in view of the third message indicating the location status associated with each of the plurality of resources of the IaaS layer and the fourth message indicating the location status associated with the user; and transmitting, by the processing device associated with the PaaS layer, a fifth message directing the platform service to instantiate on the determined resource in the IaaS layer.

8. An apparatus comprising:

a memory; and a processing device operatively coupled to the memory, the processing device to:

establish a bi-directional communication channel between a Platform as a Service (PaaS) layer and an Infrastructure as a Service (IaaS) layer using a IaaS interface unit that serves as a demarcation point between the IaaS layer and the bi-directional communication channel;

determine, by an IaaS layer manager of the IaaS layer, resource status associated with each of a plurality of resources of the IaaS layer and a preferred resource of the plurality of the resources of the IaaS layer on which to instantiate a platform service of the PaaS layer in view of the determined resource status, wherein the resource status comprising an indication of utilization of each of the plurality of the resources of the IaaS layer;

transmit, by the IaaS layer manager to a PaaS layer manager, a first message comprising the resource status associated with each of the plurality of resources of the IaaS layer through the bi-directional communication channel and comprising an indication of the determined preferred resource;

receive, from the PaaS layer manager, a second message indicating to instantiate the platform service of the PaaS layer on the preferred resource in view of the the first message, wherein the second message received via the bi-directional communication channel between the PaaS layer and the IaaS layer; and instantiate the platform service of the PaaS layer on the indicated preferred resource in the IaaS layer.

9. The apparatus of claim 8, wherein the resource status further comprises at least one of an availability of random access memory, an availability of processing time, an availability of disk space, or an availability of network bandwidth.

10. The apparatus of claim 8, wherein the processing device is further to:
  transmit, by the processing device, a third message indicating a non-preferred resource of the IaaS layer to avoid instantiating the platform service, and
  receive, from the PaaS layer, a fourth message directing the platform service to instantiate on a resource other than the non-preferred resource in the IaaS layer.

11. The apparatus of claim 8, wherein the processing device is further to:
  receive, from the PaaS layer, a third message directing the IaaS layer to allocate additional resources in the IaaS layer.

12. The apparatus of claim 8, wherein the processing device is further to:
  receive, from the PaaS layer, a third message directing the IaaS layer to remove resources from the IaaS layer.

13. The apparatus of claim 8, wherein the processing device is further to:
  transmit, by the processing device, a third message indicating a location status associated with each of the plurality of resources of the IaaS layer; and
  receive, from the PaaS layer, a fourth message directing the platform service to instantiate on a resource in the IaaS layer in view of a location status associated with a user.

14. A non-transitory computer readable storage medium including instructions that, when executed by a processing device, cause the processing device to:
  establish a bi-directional communication channel between a Platform as a Service (PaaS) layer and an Infrastructure as a Service (IaaS) layer using a PaaS interface unit that serves as a demarcation point between the PaaS layer and the bi-directional communication channel;
  receive a first message from an IaaS layer manager through the bi-directional communication channel indicating a resource status associated with each of a plurality of resources of the IaaS layer, the resource status comprising an indication of utilization of each of the plurality of the resources of the IaaS layer;
  identify, by a platform configuration module of a PaaS layer manager, a resource among the plurality of resources in the IaaS layer that is an identified resource of the IaaS layer, the identifying in view of whether the resource status in the first message indicates that the identified resource of the plurality of resources of the IaaS layer is underutilized;
  determine, by the platform configuration module, to instantiate a platform service of the PaaS layer on the identified resource of the IaaS layer; and
  transmit, by the PaaS layer manager, a second message directing the IaaS layer to instantiate the platform service on the identified resource in the IaaS layer, wherein the second message was sent through a bi-directional communication channel between the PaaS layer and the IaaS layer.

15. The non-transitory computer readable storage medium of claim 14, wherein the resource status further comprises at least one of an availability of random access memory, an availability of processing time, an availability of disk space, or an availability of network bandwidth.

16. The non-transitory computer readable storage medium of claim 14, the processing device further to:
  receive, by the processing device, a third message indicating a preferred resource of the IaaS layer to instantiate the platform service, and
  transmit, by the processing device, a fourth message directing the platform service to instantiate on the preferred resource in the IaaS layer in view of the third message indicating the preferred resource of the IaaS layer.

17. The non-transitory computer readable storage medium of claim 14, the processing device further to:
  receive, by the processing device, a third message indicating a non-preferred resource of the IaaS layer to avoid instantiating the platform service; and
  transmit, by the processing device, a fourth message directing the platform service to instantiate on a resource other than the non-preferred resource in the IaaS layer in view of the third message indicating the non-preferred resource of the IaaS layer.

18. The non-transitory computer readable storage medium of claim 14, the processing device further to:
  determine, by the processing device, whether to allocate additional resources to the IaaS layer in view of the resource status associated with each of the plurality of resources of the IaaS layer; and
  transmit, by the processing device, a third message directing the IaaS layer to allocate additional resources in the IaaS layer in response to a determination to allocate additional resources to the IaaS layer.

19. The non-transitory computer readable storage medium of claim 14, the processing device further to:
  determine, by the processing device, whether to remove resources from the IaaS layer in view of the resource status associated with each of the plurality of resources of the IaaS layer; and
  transmit, by the processing device, a third message directing the IaaS layer to remove resources from the IaaS layer in response to a determination to remove resources from the IaaS layer.

* * * * *

UNITED STATES PATENT AND TRADEMARK OFFICE
CERTIFICATE OF CORRECTION

PATENT NO. : 10,454,999 B2
APPLICATION NO. : 13/827376
DATED : October 22, 2019
INVENTOR(S) : Jeremy Eder Page 1 of 1

It is certified that error appears in the above-identified patent and that said Letters Patent is hereby corrected as shown below:

In the Claims

In Claim 8, Column 10, Line 58, delete the first "the"

Signed and Sealed this
Twenty-sixth Day of November, 2019

Andrei Iancu
*Director of the United States Patent and Trademark Office*